United States Patent [19]
Taguchi et al.

[11] Patent Number: 5,726,108
[45] Date of Patent: Mar. 10, 1998

[54] GLASS-CERAMIC MAGNETIC DISK SUBSTRATE

[75] Inventors: Tomoyuki Taguchi, Nishinomiya; Hideki Kawai, Kobe; Tohru Ohara, Akashi; Ikuo Kuriyama, Nishinomiya; Hajimu Wakabayashi, Kawanishi; Sadao Nakajima, Sakai, all of Japan

[73] Assignee: Yamamura Glass Co., Ltd., Hyogo, Japan

[21] Appl. No.: 825,732

[22] Filed: Apr. 2, 1997

Related U.S. Application Data

[63] Continuation-in-part of Ser. No. 684,049, Jul. 22, 1996, abandoned.

[30] Foreign Application Priority Data

Jul. 24, 1995 [JP] Japan ................... 7-208375
Jul. 10, 1996 [JP] Japan ................... 8-199814
Jan. 28, 1997 [JP] Japan ................... 9-028442

[51] Int. Cl.⁶ ................... C03C 10/04; C03C 10/02
[52] U.S. Cl. ................... 501/5; 501/9; 501/10; 501/63; 501/66; 501/77; 428/694 ST; 428/694 SG
[58] Field of Search ................... 501/5, 9, 10, 63, 501/66, 67, 77, 79; 428/694 ST, 694 SG

[56] References Cited

U.S. PATENT DOCUMENTS

| | | | |
|---|---|---|---|
| 4,396,720 | 8/1983 | Beall et al. | 501/5 |
| 4,519,828 | 5/1985 | Beall et al. | 65/33 |
| 5,468,694 | 11/1995 | Taguchi et al. | 501/77 |
| 5,476,821 | 12/1995 | Beall et al. | 501/10 |
| 5,567,217 | 10/1996 | Goto et al. | 65/33.1 |

FOREIGN PATENT DOCUMENTS

| | | |
|---|---|---|
| 1596848 | 10/1970 | Germany . |
| 52 38 774 | 9/1993 | Japan . |
| 94 0333479 | 12/1994 | Japan . |
| 1215478 | 12/1970 | United Kingdom . |

*Primary Examiner*—Karl Group
*Attorney, Agent, or Firm*—Young & Thompson

[57] ABSTRACT

A glass-ceramic magnetic disk substrate which is prepared by forming, then heat treating, and then polishing a crystallizable glass composition comprising, expressed in terms of weight percent on the oxide basis: from 20 to 45% $SiO_2$; from 25 to 45% $Al_2O_3$; from 10 to 25% $B_2O_3$; from 2 to 12% MgO; from 0.5 to 8% $TiO_2$; from 0.5 to 5% $P_2O_5$; from 0 to 2% $Li_2O$; from 0 to 2% $Na_2O$; from 0 to 3% $K_2O$; wherein, the total of the contents of $Li_2O$, $Na_2O$ and $K_2O$ is from 0 to 5%; and wherein the magnetic disk substrate comprises a main crystalline phase consisting of at least one member selected from the group consisting of mullite and aluminum borate crystals. The glass composition can easily be formed and the disk substrate can easily be polished, has excellent mechanical strength, surface flatness, surface smoothness, chemical durability, and heat resistance, and shows no deterioration of magnetic film characteristics by alkali migration.

5 Claims, No Drawings

GLASS-CERAMIC MAGNETIC DISK SUBSTRATE

This application is a continuation-in-part application of application Ser. No. 08/684,049, filed Jul. 22, 1996 now abandoned.

FIELD OF THE INVENTION

The present invention relates to a glass-ceramic magnetic disk substrate. More particularly, the present invention relates to a glass-ceramic magnetic disk substrate which can easily be polished, has excellent mechanical strength, surface flatness, surface smoothness, chemical durability, and heat resistance by precipitation of at least one kind of crystal selected from the group consisting of mullite and aluminum borate crystals as a main crystalline phase, is suitable for application to hard disks of computers, and can easily be formed from a specific crystallizable glass composition.

PRIOR ART OF THE INVENTION

Magnetic disks are mainly used as recording media of computers. Aluminum alloys have heretofore been used as the material of magnetic disk substrates. However, in the recent trend for a smaller size, a thinner thickness, and a higher recording density of magnetic disks, a higher surface flatness and a higher surface smoothness are increasingly desired. Aluminum alloys cannot satisfy the desire, and a material for magnetic disk substrates which can replace aluminum alloys is required.

The properties required for a magnetic disk substrate are flatness and smoothness of the disk surface, high strength, high hardness, chemical durability, migration resistance, and heat resistance of the disk substrate, and the like. Because aluminum alloys are inferior in strength and hardness, it is necessary that the thickness of the disk is increased and the surface is hardened. When the thickness of the disk is decreased, the following problem arises. Undulation is formed on the disk, and the surface flatness becomes inferior. As a result, the magnetic head more frequently clashes into the disk to cause plastic deformation of the disk, and data crush takes place. Therefore, the flying height (the distance between the magnetic head and the magnetic disk) cannot be decreased, and therefore the recording density cannot be increased. Moreover, when the magnetic film is made of platinum system alloys, a phenomenon that an electric potential is induced between the substrate of an aluminum alloy and the magnetic film, and the magnetic film is corroded because of the electrolytic corrosion occurs.

As the substrate which can solve these problems of the aluminum alloy substrates, glass substrates for magnetic disks have been developed. The glass substrates are generally classified into two types which are the chemical strengthening type and the glass-ceramic type.

It is indispensable for glass substrates of the chemical strengthening type that the glass contains an alkali component. The alkali component migrates to the surface of the substrates to make magnetic film characteristics deteriorate. Therefore, it is difficult to satisfy the increasing requirements for achieving a higher recording density. To prevent this phenomenon, an alkali barrier film must be formed. To obtain better start/stop characteristics (CSS characteristics) of a magnetic head, a roughness of angstroms to tens of angstroms is considered to be necessary on the surface of the substrate. For this purpose, glass substrates of the chemical strengthening type must be processed with a mechanical texture or a chemical texture after the final polishing, or a simultaneous texture during forming an alkali barrier film, and this causes a drawback in that the cost of production is increased.

Glass substrates of the glass-ceramic type have been developed to improve the drawbacks of the aluminum alloy substrates and the glass substrates of the chemical strengthening type. Various glass compositions have been proposed for this purpose. However, most of these glass compositions contain large amounts of alkali components. For example, a glass-ceramic composition of $SiO_2$—$Li_2O$ system is described in the specification of Japanese Patent Application Laid-Open No. Heisei 6(1994)-329440. In this composition, the alkali migration is suppressed because the alkali component is taken into the precipitated crystals to some extent. However, a considerable amount of the alkali component is left remaining in the matrix glass which is not crystalline to cause the possibility that the magnetic film characteristics deteriorate by the alkali migration in a similar manner as that of the glass composition of the chemical strengthening type. There is another drawback in that the glass is harder because of a larger content of $Si_2O$ in the glass, and therefore the polishing speed cannot be increased. Moreover, when the amount of precipitation of the crystal is large, the polishing is still more difficult. When the amount of precipitation of the crystal is decreased in order to increase the polishing speed, the content of the alkali component in the matrix glass is increased, and therefore the magnetic film characteristics are adversely affected.

Moreover, increasing the coercive force of a magnetic film has recently been attempted as a method of increasing the recording density. As a method of increasing the coercive force, a magnetic disk is heat treated at a high temperature to promote segregation of Cr in a Cr layer which is an underlayer of the magnetic film. In this method, the temperature of the heat treatment must be increased to about 650° C., and the high temperature causes a problem that substrates of aluminum alloys, glass substrates of a chemical strengthening type, and glass-ceramic substrates containing a large amount of alkali components cannot be used as the disk substrate because of the low heat resistance.

Under the above circumstances, the present inventors examined various types of glass-ceramic composition containing little alkali components, preferably no alkali components at all, and focused their investigation on glass compositions which precipitate mullite and/or aluminum borate crystals. Glass-ceramic compositions of similar types are disclosed, for example, in U.S. Pat. No. 4,396,720, U.S. Pat. No. 4,519,828, GB No. 1,215,478, U.S. Pat. No. 5,468,694, and Japanese Patent Application Laid-Open No. Heisei 5(1993)-238,774. However, these glass-ceramic compositions were not developed with the object of obtaining magnetic disk substrates, and none of these have properties satisfactory for producing the glass-ceramic magnetic disk substrate of the present invention.

In U.S. Pat. No. 4,396,720 and U.S. Pat. No. 4,519,828, transparent glass-ceramics which contain mullite (and aluminum borate crystals) and are suited for applications such as laser are disclosed. However, it is described in the specifications of these patents that $B_2O_3$ is the sole component suitable as the flux. With respect to $P_2O_5$ and $TiO_2$ which play the roles of the nuclear-forming agent and the flux simultaneously, no description is found at all about $P_2O_5$ in these patents, and no examples of using $TiO_2$ are shown in these patents. As the result, the crystallizable glass compositions show melting temperatures as high as 1650° C. (4 to 16 hours). Therefore, glass plates necessary for producing magnetic disk substrates cannot be prepared by the direct press forming.

In GB 1,215,478, a glass-ceramic which contains a crystalline solid solution of mullite-aluminum borate and is suited for applications such as an electric insulation material is disclosed. As the nuclear-forming agent, $TiO_2$, $ZrO_2$, $Cr_2O_3$, and $V_2O_5$ are disclosed. However, $ZrO_2$ alone is described in the example, and no suggestions can be found about the effect of $TiO_2$. No description is found at all about $P_2O_5$. As the result, the crystallizable glass composition show melting temperatures as high as 1620° C. or less, similarly to the above glass composition. Therefore, glass plates necessary for producing magnetic disk substrates cannot be prepared by the direct press forming. Moreover, although it is described that the total content of MgO, CaO, BaO, ZnO, and PbO is 3 to 15% by weight, no compositions having a content of MgO alone of more than 3% by weight can be found, and no examples in which 2% by weight or more of MgO is contained can be found, either.

In U.S. Pat. No. 5,468,694, an insulating substrate which is prepared by sintering powder of a crystallizable glass composition, alone or as a mixture with inorganic fillers, and contains mullite as the main crystalline phase is disclosed. It is disclosed that, among the glass composition, $ZrO_2$ and $SnO_2$ are contained optionally (not as essential components) as the nuclear-forming agent. $Al_2O_3$ is contained in a large amount. $P_2O_5$ and $TiO_2$ which play the roles of the nuclear-forming agent and the flux simultaneously are not contained. Therefore, the melting temperature is as high as 1540° to 1600° C. (2 to 3 hours; Table 1 contains a printing error at Examples A(5), and 1500 should be corrected to 1600), and the tendency to cause devitrification is enhanced. Although powder can be prepared, glass plates necessary for producing magnetic disk substrates cannot be prepared by the direct press forming. A glass block having the size required for a magnetic disk substrate cannot be obtained by cast forming, either.

In Japanese Patent Application Laid-Open No. Heisei 5(1993)-238774, an insulating substrate which is prepared by sintering powder of a crystallizable glass composition and contains double crystal phases of mullite and cordierite is disclosed. At least one of $ZrO_2$ and $SnO_2$ is contained in the glass composition as the nuclear-forming agent. None of $P_2O_5$ and $TiO_2$ are contained. MgO is contained in a large amount, and cordierite which is precipitated at the surface is contained in a large amount because the substrate is prepared by sintering powder. Therefore, the mechanical strength required for a magnetic disk substrate is not obtained.

SUMMARY OF THE INVENTION

Accordingly, the present invention has the object of providing a glass-ceramic magnetic disk substrate which can easily be polished, has excellent mechanical strength, surface flatness, surface smoothness, chemical durability, and heat resistance, and shows no deterioration of the magnetic film characteristics by alkali migration.

As the result of the extensive studies undertaken by the present inventors to solve the problems described above, it has been discovered that a crystallizable glass composition having a specific composition which precipitates mullite and/or aluminum borate crystals by a heat treatment can easily be formed, and resultant glass-ceramic substrate can easily be polished and is excellent in the physical and chemical characteristics as a magnetic disk substrate. The present invention has been completed on the basis of the discovery.

Thus, the present invention provides:

(1) A glass-ceramic magnetic disk substrate which is prepared by forming, (the following) heat treating, and (the following) polishing a crystallizable glass composition comprising, expressed in terms of weight percent on the oxide basis:

from 20 to 45% $SiO_2$; from 0.5 to 5% $P_2O_5$;
from 25 to 45% $Al_2O_3$; from 0 to 2% $Li_2O$;
from 10 to 25% $B_2O_3$; from 0 to 2% $Na_2O$;
from 2 to 12% MgO; from 0 to 3% $K_2O$;
from 0.5 to 8% $TiO_2$;

wherein, the total of the contents of $Li_2O$, $Na_2O$ and $K_2O$ is from 0 to 5%; and wherein, said magnetic disk substrate comprises a main crystalline phase consisting of at least one kind selected from the group consisting of mullite and aluminum borate crystals;

(2) The glass-ceramic magnetic disk substrate described in (1), wherein said glass composition comprising, expressed in terms of weight percent on the oxide basis:

from 25 to 43% $SiO_2$; from 0.5 to 5% $P_2O_5$;
from 25 to 40% $Al_2O_3$; from 0 to 2% $Li_2O$;
from 10 to 22% $B_2O_3$; from 0 to 2% $Na_2O$;
from 3 to 7.5% MgO; from 0 to 3% $K_2O$;
from 0.5 to 8% $TiO_2$;

wherein, the total of the contents of $Li_2O$, $Na_2O$ and $K_2O$ is from 0 to 3%;

(3) The glass-ceramic magnetic disk substrate described in (1), wherein said glass composition comprising, expressed in terms of weight percent on the oxide basis:

from 30 to 40% $SiO_2$; from 0 to 2% $Li_2O$;
from 27 to 38% $Al_2O_3$; from 0 to 2% $Na_2O$;
from 12 to 20% $B_2O_3$; from 0 to 3% $K_2O$;
from 3.5 to 7% MgO; from 0 to 10% CaO;
from 1.5 to 6% $TiO_2$; from 0 to 10% BaO;
from 1 to 3% $P_2O_5$; from 0 to 10% ZnO;

wherein, the total of the contents of $Li_2O$, $Na_2O$ and $K_2O$ is from 0 to 3%;

(4) The glass-ceramic magnetic disk substrate described in (1), wherein said glass composition further comprises from 0.01 to 0.5% by weight of at least one component selected from the group consisting of Nb, La, Sn, Co, Mn, V, Cr, Cu, Au, Ag, Pt, Mo, Ni, Fe, Te, Ce, Se, Nd, Pr, Sm, Er and S; and (5) The glass-ceramic magnetic disk substrate described in (1), wherein said magnetic disk substrate includes crystals having an average crystal grain size of 3 μm or less, and has a surface roughness of $Ra \leq 50$ Å.

DETAILED DESCRIPTION OF THE INVENTION

The crystallizable glass composition for producing glass-ceramic magnetic disk substrates of the present invention comprises the following composition in the form of oxides: $SiO_2$: 20 to 45% by weight, $Al_2O_3$: 25 to 45% by weight, $B_2O_3$: 10 to 25% by weight, MgO: 2 to 12% by weight, $TiO_2$: 0.5 to 8% by weight, $P_2O_5$: 0.5 to 5% by weight, $Li_2O$: 0 to 2% by weight, $Na_2O$: 0 to 2% by weight, and $K_2O$: 0 to 3% by weight, wherein $Li_2O+Na_2O+K_2O$ is 0 to 5% by weight; and precipitates a main crystalline phase consisting of at least one kind selected from the group consisting of mullite and aluminum borate crystals by a heat treatment.

In the crystallizable glass composition for producing glass-ceramic magnetic disk substrates of the present invention, where necessary, the following components may additionally be contained: CaO: 0 to 10% by weight, SrO: 0 to 10% by weight, BaO: 0 to 10% by weight, ZnO: 0 to 10% by weight, $ZrO_2$: 0 to 5% by weight, $SnO_2$: 0 to 5% by weight, $MoO_3$: 0 to 5% by weight, $WO_3$: 0 to 5% by weight, and at least one component selected from Nb, La, Sn, Co, Mn, V, Cr, Cu, Au, Ag, Pt, Mo, Ni, Fe, Te, Ce, Se, Nd, Pr, Sm, Er and S in an amount of 0.01 to 0.5% by weight.

In the composition for producing glass-ceramic magnetic disk substrates of the present invention, $SiO_2$ is a glass network-former and a component of mullite ($3Al_2O_3.2SiO_2$) which is the main crystalline phase precipitated by a heat treatment. When the content of $SiO_2$ is less than 20% by weight, the precipitation of mullite becomes difficult, and also there is the possibility that the chemical durability of the remaining glass matrix phase and the heat resistance of the glass-ceramic substrate become inferior. When the content of $SiO_2$ is more than 45% by weight, the composition is in a stable glass formation region, and the precipitation of the crystals becomes difficult. Moreover, the melting temperature is excessively high, and there is the possibility that the production becomes difficult. Considering the amount of the precipitation of the crystals, the chemical durability, the heat resistance, and the productivity, it is preferable that the content of $SiO_2$ is in a range of from 25 to 43% by weight. It is more preferable that the content of $SiO_2$ is in a range of from 30 to 40% by weight.

In the composition for producing glass-ceramic magnetic disk substrates of the present invention, $Al_2O_3$ is an intermediate oxide of the glass and a component of mullite and aluminum borate crystals which are the main crystalline phases precipitated by a heat treatment. When the content of $Al_2O_3$ is less than 25% by weight, the amount of the precipitation of the crystals is small, and there is the possibility that the strength required for a magnetic disk substrate cannot be obtained, and the heat resistance is inferior. When the content of $Al_2O_3$ is more than 45% by weight, the melting temperature is excessively high, and the composition tends to be devitrified to cause the possibility that the forming cannot easily be made. Considering the strength, the heat resistance, and the forming property, it is preferable that the content of $Al_2O_3$ is in a range of from 25 to 40% by weight. It is more preferable that the content of $Al_2O_3$ is in a range of from 27 to 38% by weight.

In the composition for producing glass-ceramic magnetic disk substrates of the present invention, $B_2O_3$ plays the role as a flux and also is a component of the aluminum borate crystals. When the content of $B_2O_3$ is less than 10% by weight, there is the possibility that the melting temperature is excessively high. When the content of $B_2O_3$ is more than 25% by weight, the composition tends to be devitrified to cause the possibility that the forming cannot easily be made. Considering the melting property and the forming property, it is preferable that the content of $B_2O_3$ is in a range of from 10 to 22% by weight. It is more preferable that the content of $B_2O_3$ is in a range of from 12 to 20% by weight.

In the composition for producing glass-ceramic magnetic disk substrates of the present invention, MgO is a glass network-modifier and has the function of extending the working temperature range and increasing the chemical durability of the remaining glass matrix phase. When the content of MgO is less than 2% by weight, the working temperature range becomes narrower, and also there is the possibility that the chemical durability of the remaining glass matrix is not increased. When the content of MgO is more than 12% by weight, the amount of the precipitation of cordierite ($2MgO.2Al_2O_3.5SiO_2$) tends to increase, and therefore there is the possibility that the strength required for a magnetic disk substrate cannot be obtained. Considering the working property, the chemical durability, and the strength, it is preferable that the content of MgO is in a range of from 3 to 7.5% by weight. It is more preferable that the content of MgO is in a range of from 3.5 to 7% by weight.

$P_2O_5$ and $TiO_2$ play the roles of the nuclear-forming agent and the flux. When the content of $P_2O_5$ is less than 0.5% by weight, the effects as the nuclear-forming agent and the flux are small. When the content of $P_2O_5$ is more than 5% by weight, there is the possibility that the chemical durability is inferior. Considering the crystal grain size, the amount of the precipitation of the crystals, the melting property, the forming property, and the chemical durability, the content of $P_2O_5$ is preferably 1 to 3% by weight. In addition to the above roles, $TiO_2$ also plays the role of an important component which sensitively absorbs laser beam during the texturing by laser beam and induces change in the surface structure of the magnetic disk substrate. When the content of $TiO_2$ is less than 0.5% by weight, there is the possibility that the effects as the nuclear-forming agent, the flux, and the component for absorbing laser beam are small. When the content of $TiO_2$ is more than 8% by weight, the glass composition tends to be devitrified to cause the possibility that the forming cannot easily be made. The grain size of the crystals precipitated during the heat treatment is also increased, and there is the possibility that the strength of the substrate is decreased, and the smoothness of the surface of the substrate becomes inferior. Considering the crystal grain size, the amount of the precipitation of the crystals, the melting property, the forming property, the strength of the substrate, the surface smoothness of the substrate, and the effect as the component for absorbing laser beam, the content of $TiO_2$ is preferably 1.5 to 6% by weight.

$P_2O_5$ exhibits a particularly large effect as the flux, and the melting property is remarkably improved by addition of a small amount of $P_2O_5$. Particularly, the melting temperature is decreased below 1530° C. Therefore, $P_2O_5$ is an indispensable component for the direct press forming of the substrate. For obtaining the same effect by using $TiO_2$ alone, a large amount of $TiO_2$ must be used to cause problems, such as devitrification, decrease in the strength of the substrate, and inferior smoothness of the surface of the substrate. $TiO_2$ exhibits a particularly large effect as the nuclear-forming agent in the system of the glass composition and is an indispensable component for obtaining the strength required for a magnetic disk substrate. For obtaining the same effect by using $P_2O_5$ alone, a large amount of $P_2O_5$ must be used to cause problems, such as inferior chemical durability. Therefore, it is important that $TiO_2$ and $P_2O_5$ are used in combination.

$ZrO_2$, $SnO_2$, $MoO_3$, and $WO_3$ which may additionally be contained in the composition for producing glass-ceramic magnetic disk substrates of the present invention where necessary play the role of nuclear-forming agents. $ZrO_2$ and $SnO_2$ play the role of nuclear-forming agent even when small amounts are used and also have the function of increasing the chemical durability of the remaining glass matrix phase. When the content of $ZrO_2$ or $SnO_2$ is more than 5% by weight, it is difficult to achieve uniform melting and the batch stones remain. As the result, there is the possibility that increase in the melting temperature is brought about. $MoO_3$ and $WO_3$ have the function of accelerating crystallization in a glass containing a large amount of the $B_2O_3$ component. When the content of $MoO_3$ or $WO_3$ is more than 5% by weight, there is the possibility that the glass is devitrified during the forming.

In the composition for producing glass-ceramic magnetic disk substrates of the present invention, $Li_2O$, $Na_2O$, and $K_2O$ are each a flux and improve the melting property of the composition. When the migration resistance of the magnetic disk substrate is taken into consideration, it is preferred that these alkali components are not contained. However, the alkali components are used for improving the melting property and the forming property when the basic composition requires the improvement. $Li_2O$, $Na_2O$, or $K_2O$ may be used alone, or two or more components selected from $Li_2O$, $Na_2O$, and $K_2O$ may be used in combination. In order to keep the migration resistance of the magnetic disk substrate as high as possible, it is preferred that two or more components are used in combination. When two components selected from $Li_2O$, $Na_2O$, and $K_2O$ are used in combination, any combination of two components may be used. In order to keep the migration resistance of the magnetic disk substrate as high as possible, the combination of $Li_2O$ and $K_2O$ is most preferable. In the composition of the present invention, the contents of $Li_2O$ and $Na_2O$ are each 0 to 2% by weight, the content of $K_2O$ is 0 to 3% by weight, and the total of the contents of $Li_2O$, $Na_2O$, and $K_2O$ is 0 to 5% by weight, preferably 0.1 to 3% by weight when the melting property, the forming property, the migration resistance, and the heat resistance are taken into consideration. Moreover, it is more preferable that the total of the contents of $Li_2O$, $Na_2O$, and $K_2O$ is 0.3 to 1.5% by weight. When the content of $Li_2O$ or $Na_2O$ is more than 2% by weight, or when the content of $K_2O$ is more than 3% by weight, or when the total of the contents of $Li_2O$, $Na_2O$, and $K_2O$ is more than 5% by weight, there is the possibility that the migration resistance and the heat resistance of the magnetic disk substrate is decreased. Because the alkali free glass-ceramics or the low alkali-containing glass-ceramics is produced as described above, the disk substrates of the present invention can keep the excellent magnetic film characteristics without forming an alkali barrier film on the magnetic disk substrate.

CaO, SrO and BaO which may additionally be contained in the composition for producing glass-ceramic magnetic disk substrates of the present invention where necessary are glass network-modifiers. These components have the function of extending the working temperature range and, moreover, increasing the chemical durability of the remaining glass matrix phase. When the content of CaO, SrO or BaO is more than 10% by weight, the glass becomes excessively stable, and therefore there is the possibility that the amount of the precipitation of the crystals is decreased. Considering the working property, the chemical durability, and the amount of the precipitation of the crystals, it is preferable that the contents of CaO, SrO, and BaO are each in a range of from 0.1 to 7% by weight. It is more preferable that the contents of CaO, SrO, and BaO are each in a range of from 0.5 to 5% by weight.

ZnO which may additionally be contained in the composition for producing glass-ceramic magnetic disk substrates of the present invention where necessary plays the role as a flux and has the function of increasing the chemical durability of the remaining glass matrix phase. By replacing a part of $B_2O_3$ as the flux with ZnO, the amount of $B_2O_3$ which tends to vaporize during melting can be decreased. When the content of ZnO is more than 10% by weight, there is the possibility that the amount of the precipitation of the crystals is decreased. Considering the melting property, the chemical durability, and the amount of the precipitation of the crystals, it is preferable that the content of ZnO is in a range of from 0 to 7% by weight. It is more preferable that the content of ZnO is in a range of from 0.1 to 5% by weight.

In the present invention, at least one component selected from the group consisting of Nb, La, Sn, Co, Mn, V, Cr, Cu, Au, Ag, Pt, Mo, Ni, Fe, Te, Ce, Se, Nd, Pr, Sm, Er and S may be used in combination with $TiO_2$ in order to increase the absorbance of laser beam of the glass-ceramic magnetic disk substrate. When the above components are used in combination with $TiO_2$, the total content of the above components is preferably 0.01 to 0.5% by weight. When the total content of these components is less than 0.01% by weight, there is the possibility that the absorbance of laser beam cannot be increased. When the total content of these components is more than 0.5% by weight, there is the possibility that the amount of the precipitation of the crystals, the crystal grain size, and the heat resistance are inferior. The total content of these components is more preferably 0.1 to 0.45% by weight, considering the absorbance of laser beam, the amount of the precipitation of the crystals, the crystal grain size, and the heat resistance.

In the composition for producing glass-ceramic magnetic disk substrate of the present invention, PbO, $Bi_2O_3$, $F_2$, $Cs_2O$, and the like may additionally be contained within the range that the properties required for the magnetic disk substrate are not adversely affected. Furthermore, a clarifying agent such as $Sb_2O_3$ and $As_2O_3$ may be contained.

The crystallizable glass composition for producing magnetic disk substrates of the present invention precipitates a main crystalline phase consisting of at least one kind selected from the group consisting of mullite and aluminum borate crystals in the course of being subjected to a heat treatment. The mullite crystal has a cylindrical shape of a low aspect ratio. The aluminum borate crystals are crystals having, for example, a composition of $Al_{18}B_4O_{33}$, $Al_5(BO_3)O_6$, or the like, and have a cylindrical shape of a low aspect ratio. A crystal having a cylindrical shape of a low aspect ratio, such as those described above, does not cause falling-off of the crystal during the polishing. The falling-off of crystals has been the problem up to the present. Mullite and aluminum borate crystals have high mechanical strength characteristics. The amount of the precipitation of the crystals and the mechanical strength are closely related. For sufficiently obtaining the mechanical strength required for the magnetic disk substrate, it is preferable that the amount of the precipitation of the crystals is as high as possible within the range that the polishing can efficiently be conducted.

In the crystallizable glass composition for producing glass-ceramic magnetic disk substrates of the present invention, subordinate crystalline phases, such as cordierite, Mg-spinel, Zn-spinel, anorthite, celsian, rutile, forsterite, enstatite, willemite, lithium aluminosilicate system, and the like, are sometimes precipitated by the heat treatment in addition to the main crystalline phase described above. The characteristics of the composition of the present invention are not adversely affected by the precipitation of these subordinate crystalline phases.

The glass-ceramic magnetic disk substrate of the present invention is a glass-ceramic magnetic disk substrate comprising the main crystalline phase consisting of at least one kind selected from the group consisting of mullite and aluminum borate crystals, which is prepared by forming, the following heat treating, and the following polishing the crystallizable glass composition for magnetic disk substrates of the present invention. The process for forming the crystallizable glass composition is not particularly limited, and the forming can be conducted by the press forming or the casting-slice forming of a glass melted by heating in a furnace or by direct electric melting. It is the characteristic of the present invention that the direct press forming is enabled. The process for heat treating the formed glass composition is not particularly limited, and a suitable process can be selected in accordance with the content of the nuclear-forming agent and the like. A process in which many crystal nuclei are formed by a heat treatment at a relatively low temperature, and then crystals are allowed to grow at an elevated temperature, is preferable in order to obtain fine crystal grains. The crystallizable glass composition for producing glass-ceramic magnetic disk substrates of the present invention precipitates the main crystalline phase consisting of at least one kind selected from the group consisting of mullite and aluminum borate crystals in the course of being subjected to the heat treatment. The process for polishing the glass-ceramic substrate after the heat treatment is not particularly limited. The polishing can be conducted in accordance with a conventional process by using, for example, synthetic abrasive grains, such as synthetic diamond, silicon carbide, aluminum oxide, boron carbide, c-BN, silica, zirconium oxide, and the like, or natural abrasive grains, such as natural diamond, cerium oxide, and the like.

The glass-ceramic magnetic disk substrate of the present invention preferably has an average crystal grain size of 3 μm or less, more preferably an average crystal grain size of 1 μm or less. When the average crystal grain size is more than 3 μm, the mechanical strength of the magnetic disk substrate is decreased, and moreover, there is the possibility that falling-off of crystal grains takes place during the polishing to cause inferior surface roughness of the substrate.

The glass-ceramic magnetic disk substrate of the present invention preferably has a surface roughness of Ra≦50 Å, which is obtained in accordance with Japanese Industrial Standard B 0601-1994. Ra has a great influence on achieving a smaller size, a thinner thickness, and a higher recording density of a magnetic disk. When Ra is more than 50 Å, the flying height cannot be decreased, and therefore there is the possibility that a high recording density cannot be achieved. Considering the higher recording density of the magnetic disk, it is preferable that Ra is 30 Å or less. It is more preferable that Ra is 15 Å or less.

By using the crystallizable glass composition for producing glass-ceramic magnetic disk substrates of the present invention, an excellent glass-ceramic magnetic disk substrate comprising the main crystalline phase consisting of at least one kind selected from the group consisting of mullite and aluminum borate crystals and having a high strength, a high hardness, a good chemical durability, and a high heat resistance can be obtained. Because the composition for producing glass-ceramic magnetic disk substrates of the present invention is alkali free or low alkali-containing, a high migration resistance of the magnetic disk substrate can be achieved, and therefore the magnetic film characteristics are kept at the highest level.

The glass-ceramic magnetic disk substrate of the present invention sufficiently satisfies all the flatness and the smoothness of the disk surface, the high strength, the high hardness, the chemical durability, the heat resistance, and the migration resistance of the disk substrate which are required for a magnetic disk substrate. The glass-ceramic magnetic disk substrate of the present invention can more easily be polished than conventional glass-ceramic substrates, such as a $Li_2O$—$SiO_2$ system glass-ceramic substrate. The crystal grain size and the amount of the precipitation of the crystals can be controlled by gradually changing the heat treatment schedule or the glass composition, and the formation of the texture can be conducted simultaneously with the polishing in the final polishing process. When the zone texturing is conducted, it is preferred that the surface is made as smooth as possible by the polishing process, and the laser texturing is conducted on the desired parts of the thus polished surface. The method of the laser texturing is not particularly limited. For example, solid laser, excimer laser, gas laser, or semiconductor laser can be used. The condition of irradiation of laser is not particularly limited. In general, the desired bump can easily be formed by adjusting the energy density to 0.1 to 100 $J/cm^2$, preferably to 0.2 to 50 $J/cm^2$, and the pulse width to 0.1 to 1000 ns, preferably 10 to 200 ns. It is preferred that the bump height is 300 Å or less, and the range of the height is ±15% or less of the average of the height.

To summarize the advantages obtained by the present invention, the crystallizable glass composition for producing glass-ceramic magnetic disk substrates of the present invention can easily be formed, precipitates a main crystalline phase consisting of at least one kind selected from the group consisting of mullite and aluminum borate crystals by a heat treatment, and the disk substrate is easily polished. The glass-ceramic magnetic disk substrate having the excellent mechanical strength, surface flatness, surface smoothness, chemical durability, heat resistance, and migration resistance can be prepared from the crystallizable glass composition.

The present invention is described in more detail in the following with reference to examples. However, the present invention is not limited by the examples.

The raw materials used in the examples and the comparative examples are: $SiO_2$, $Al(OH)_3$, $H_3BO_3$, $Mg(OH)_2$, $CaCO_3$, $SrCO_3$, $BaCO_3$, $ZnO$, $TiO_2$, $ZrO_2$, $AlPO_4$, $SnO_2$, $MoO_3$, $La_2O_3$, $Fe_2O_3$, $V_2O_5$, $Nb_2O_5$, $Cu_2O$, $Li_2CO_3$, $Na_2CO_3$, $K_2CO_3$, and $Sb_2O_3$.

In the examples and the comparative examples, the kind of the crystalline phase, the crystal grain size, Ra, bending strength, and bump height were measured by the following methods.

(1) Kind of the crystalline phase

The obtained polished product was examined by using an X-ray diffraction apparatus.

(2) Crystal grain size

A sample was prepared by dipping the obtained polished product in a 5% by weight hydrofluoric acid for 5 seconds. The surface of the sample was observed by a scanning electron microscope. In the observed field of a 10,000 times magnification, 10 crystal grains were selected at random, and the crystal grain size was obtained as the average of longer diameters of these crystal grains.

(3) Ra

The surface of the obtained polished product was observed by using an atomic force microscope (a product of Digital Instruments Company). On the surface of the sample, 5 parts were selected at random. In each part, 4 lines were drawn at random in the observed field of 10 μm×10 μm, and Ra along each line was measured. Ra was obtained as the average of 20 measurements in total.

(4) Bending strength

After a formed glass was heat treated, the obtained glass-ceramic was processed in accordance with the method of Japanese Industrial Standard R 1601, and the bending strength was measured by the three point bending.

(5) Bump height

The surface of a sample which had been polished and then irradiated with laser beam was observed by an atomic force microscope (a product of Digital Instruments Company), and the sectional shape of the surface was obtained by the line analysis. The bump height was obtained from the obtained sectional shape.

EXAMPLE 1

Raw materials for the components are weighed and mixed in such amounts that the glass composition would have the following composition: $SiO_2$: 23% by weight, $Al_2O_3$: 39% by weight, $B_2O_3$: 19% by weight, MgO: 10% by weight, CaO: 2% by weight, BaO: 1.5% by weight, ZnO: 2% by weight, $TiO_2$: 2% by weight, $P_2O_5$: 0.5% by weight, and $Li_2O$: 1% by weight. The obtained mixture was placed in a platinum crucible in an electric furnace, melted, and stirred to obtain a homogeneous glass. Then, the obtained homogeneous glass was formed into a plate of 50×50×5 mm. The obtained plate was annealed and cooled to obtain a formed product.

The obtained formed product was heat treated at 700° C. for 2 hours, and then at 870° C. for 2 hours to precipitate crystalline phase in the glass. The surface of the heat treated product was treated with lapping for 30 minutes by using silicon carbide abrasive grains having the average grain diameter of 10 μm, and then polished for 15 minutes with cerium oxide abrasive grains having the average grain diameter of 1 μm to obtain a polished product.

The polished product contained the main crystalline phase consisting of aluminum borate crystals and mullite. The content of other crystals in the product was very small. The crystal grain size was 1.7 μm, the bending strength was 230 MPa, and Ra was 20 Å.

EXAMPLES 2 TO 16

Glass compositions were formed and heat treated in accordance with the same procedures as those in Example 1 in accordance with the conditions shown in Table 1. The obtained glass-ceramic products were polished in accordance with the same procedures as those in Example 1.

The kind of the crystalline phase, the crystal grain size, the bending strength, and Ra in the obtained polished glass-ceramic products were measured. The results are shown in Table 1.

EXAMPLE 17

Raw materials for the components are weighed and mixed in such amounts that the glass composition would have the following composition: $SiO_2$: 36.0% by weight, $Al_2O_3$: 33.0% by weight, $Li_2O$: 0.5% by weight, $TiO_2$: 4.5% by weight, $SnO_2$: 1.45% by weight, $P_2O_5$: 1.5% by weight, $Sb_2O_3$: 0.5% by weight, $B_2O_3$: 15.0% by weight, MgO: 5.5% by weight, CaO: 1.0% by weight, ZnO: 1.0% by weight, and $Cu_2O$: 0.05% by weight. The obtained mixture was placed in a platinum crucible in an electric furnace, melted, and stirred to obtain a homogeneous glass. Then, the obtained homogeneous glass was formed into a plate of 50×50×5 mm. The obtained plate was annealed and cooled to obtain a formed product.

The obtained formed product was heat treated at 680° C. for 2 hours, and then at 850° C. for 2 hours to precipitate crystalline phase in the glass. After the heat treated product was cut and sliced, the surface of the obtained product was treated with lapping for 30 minutes by using silicon carbide abrasive grains having the average grain diameter of 10 μm, and then polished for 15 minutes with cerium oxide abrasive grains having the average grain diameter of 1 μm to obtain a polished product having a thickness of 0.635 mm.

The polished product contained a main crystalline phase consisting of mullite and aluminum borate crystals and a subordinate crystalline phase consisting of rutile.

The above polished product was textured by irradiation of SHG (secondary harmonic generation) of YAG laser beam of a wavelength of 532 nm under the condition of an energy density of 3 $J/cm^2$, a pulse width of 50 ns, and a number of pulse of 1. The obtained product after the irradiation had a bump height of 230 Å and showed the desirable properties as a magnetic disk substrate.

EXAMPLE 18

Raw materials for the components are weighed and mixed in such amounts that the glass composition would have the following composition: $SiO_2$: 36.0% by weight, $Al_2O_3$: 33.0% by weight, $Li_2O$: 0.5% by weight, $TiO_2$: 4.5% by weight, $ZrO_2$: 1.2% by weight, $P_2O_5$: 1.5% by weight, $Sb_2O_3$: 0.5% by weight, $B_2O_3$: 15.0% by weight, MgO: 5.5% by weight, CaO: 1.0% by weight, ZnO: 1.0% by weight, and $MnO_2$: 0.3% by weight. The obtained mixture was placed in a platinum crucible in an electric furnace, melted, and stirred to obtain a homogeneous glass. Then, the obtained homogeneous glass was formed into a plate of 50×50×5 mm. The obtained plate was annealed and cooled to obtain a formed product.

The obtained formed product was heat treated at 680° C. for 2 hours, and then at 850° C. for 2 hours to precipitate crystalline phase in the glass. After the heat treated product was cut and sliced, the surface of the obtained product was treated with lapping for 30 minutes by using silicon carbide abrasive grains having the average grain diameter of 10 μm, and then polished for 15 minutes with cerium oxide abrasive grains having the average grain diameter of 1 μm to obtain a polished product having a thickness of 0.635 mm.

The polished product contained a main crystalline phase consisting of mullite and aluminum borate crystals and a subordinate crystalline phase consisting of rutile.

The above polished product was textured by irradiation of SHG of Ti-sapphire laser beam of a wavelength of 430 nm under the condition of an energy density of 1 $J/cm^2$, a pulse width of 50 ns, and a number of pulse of 1. The obtained product after the irradiation had a bump height of 205 Å and showed the desirable properties as a magnetic disk substrate.

TABLE 1-1

| Example | 1 | 2 | 3 | 4 | 5 | 6 |
|---|---|---|---|---|---|---|
| Composition (% by weight) | | | | | | |
| $SiO_2$ | 23 | 25 | 30 | 32 | 33 | 34 |
| $Al_2O_3$ | 39 | 43 | 37 | 32 | 30 | 35 |
| $B_2O_3$ | 19 | 14 | 12 | 20 | 23 | 17 |
| MgO | 10 | 8 | 10 | 5 | 12 | 7 |
| CaO | 2 | 2 | 2 | 3.5 | — | — |
| SrO | — | — | — | — | — | — |

TABLE 1-1-continued

| Example | 1 | 2 | 3 | 4 | 5 | 6 |
|---|---|---|---|---|---|---|
| BaO | 1.5 | 1.5 | 2 | 5 | — | — |
| ZnO | 2 | — | 1 | — | — | 1 |
| $TiO_2$ | 2 | 3 | 3 | 1 | 0.5 | 3 |
| $ZrO_2$ | — | — | 1 | — | — | — |
| $P_2O_5$ | 0.5 | 1 | 1 | 1 | 0.5 | 1 |
| $SnO_2$ | — | — | — | — | — | — |
| $MoO_3$ | — | — | — | — | — | — |
| $WO_3$ | — | — | — | — | — | — |
| $Li_2O$ | 1 | — | 1 | — | — | — |
| $Na_2O$ | — | 2 | — | — | — | 1 |
| $K_2O$ | — | — | — | — | 1 | 1 |
| $Sb_2O_3$ | — | 0.5 | — | 0.5 | — | — |
| heat treatment 1 | | | | | | |
| temperature (°C.) | 700 | 700 | 700 | 650 | 650 | 690 |
| time (hr) | 2 | 2 | 2 | 2 | 2 | 2 |
| heat treatment 2 | | | | | | |
| temperature (°C.) | 870 | 850 | 860 | 860 | 830 | 870 |
| time (hr) | 2 | 2 | 2 | 2 | 2 | 5 |
| kind of the predominant crystalline phase* | Al-B mullite | mullite Al-B | mullite — | mullite Al-B | Al-B mullite | mullite Al-B |
| kind of the subordinate crystalline phase | — | — | — | — | cordierite — | — |
| crystal grain size (μm) | 1.7 | 1.1 | 0.7 | 0.9 | 0.5 | 1.8 |
| bending strength (MPa) | 230 | 215 | 200 | 190 | 190 | 200 |
| Ra (Å) | 20 | 9 | 8 | 10 | 5 | 18 |

*Al-B: aluminum borate crystals

TABLE 1-2

| Example | 7 | 8 | 9 | 10 | 11 |
|---|---|---|---|---|---|
| Composition (% by weight) | | | | | |
| $SiO_2$ | 36 | 37 | 37 | 39 | 44 |
| $Al_2O_3$ | 27 | 33 | 32 | 30 | 25 |
| $B_2O_3$ | 15 | 11 | 14 | 11 | 17 |
| MgO | 12 | 3 | 5.5 | 5 | 5 |
| CaO | 1 | 2 | 1.5 | 7 | 1 |
| SrO | 1 | — | — | 1 | — |
| BaO | 1 | 1.5 | — | — | — |
| ZnO | 1 | 5 | 1 | 4 | — |
| $TiO_2$ | 2 | 4 | 5 | 1.2 | 6.5 |
| $ZrO_2$ | — | — | — | — | — |
| $P_2O_5$ | 1 | 1 | 1.5 | 0.8 | 0.5 |
| $SnO_2$ | — | — | 1 | — | — |
| $MoO_3$ | — | — | — | — | — |
| $Fe_2O_3$ | — | — | 0.5 | — | — |
| $Li_2O$ | 1 | 1 | 0.5 | 1 | 0.5 |
| $Na_2O$ | 1 | — | — | — | — |
| $K_2O$ | 1 | 1 | — | — | 0.5 |
| $Sb_2O_3$ | — | 0.5 | 0.5 | — | — |
| heat treatment 1 | | | | | |
| temperature (°C.) | 690 | 660 | 680 | 650 | 650 |
| time (hr) | 2 | 2 | 2 | 3 | 2 |
| heat treatment 2 | | | | | |
| temperature (°C.) | 840 | 870 | 850 | 850 | 810 |
| time (hr) | 2 | 2 | 2 | 2 | 3 |
| kind of the predominant crystalline phase* | mullite Al-B | mullite — | mullite Al-B | mullite — | mullite Al-B |
| kind of the subordinate crystalline phase | cordierite — — | Al-B rutile Zn-spinel | rutile — — | Al-B anorthite — | rutile — — |
| crystal grain size (μm) | 0.7 | 0.8 | 0.5 | 0.6 | 1.4 |
| bending strength (MPa) | 195 | 210 | 210 | 200 | 190 |
| Ra (Å) | 7 | 9 | 5 | 8 | 14 |

*Al-B: aluminum borate crystals

TABLE 1-3

| Example | 12 | 13 | 14 | 15 | 16 |
|---|---|---|---|---|---|
| Composition (% by weight) | | | | | |
| $SiO_2$ | 34.5 | 33 | 32 | 32 | 31 |
| $Al_2O_3$ | 35 | 35 | 33 | 34 | 32.5 |
| $B_2O_3$ | 16 | 17 | 16 | 14.5 | 18 |
| MgO | 5 | 8 | 5 | 6 | 7 |
| CaO | 3 | — | 1.9 | 1.5 | 1.5 |
| SrO | — | — | 0.8 | — | — |
| BaO | 0.5 | — | — | — | 1.2 |
| ZnO | 0.5 | — | 1 | 1 | 2 |
| $TiO_2$ | 2 | 4 | 4 | 4.5 | 3 |
| $P_2O_5$ | 1.5 | 1 | 5 | 4.5 | 3 |
| $La_2O_3$ | 0.5 | — | — | — | — |
| $Fe_2O_3$ | — | 0.5 | — | — | — |
| $V_2O_5$ | — | 0.5 | — | — | — |
| $Nb_2O_5$ | — | — | 0.3 | — | — |
| $Cu_2O$ | — | — | — | 0.5 | 0.3 |
| $Li_2O$ | 1 | 1 | 1 | 1 | — |
| $Na_2O$ | — | — | — | — | — |
| $K_2O$ | — | — | — | — | — |
| $Sb_2O_3$ | 0.5 | — | — | 0.5 | 0.5 |
| heat treatment 1 | | | | | |
| temperature (°C.) | 680 | 690 | 680 | 680 | 695 |
| time (hr) | 2 | 2 | 2 | 2 | 2 |
| heat treatment 2 | | | | | |
| temperature (°C.) | 850 | 900 | 950 | 960 | 900 |
| time (hr) | 2 | 2 | 2 | 2 | 2 |
| kind of the predominant crystalline phase* | mullite Al-B | mullite Al-B | mullite Al-B | mullite Al-B | mullite Al-B |
| kind of the subordinate crystalline phase | — | rutile | rutile | rutile | rutile |
| crystal grain size (μm) | 0.7 | 0.6 | 0.7 | 0.8 | 0.7 |
| bending strength (MPa) | 195 | 210 | 200 | 200 | 195 |
| Ra (Å) | 8 | 7 | 7 | 6 | 7 |

*Al-B: aluminum borate crystals

TABLE 1-4

| Example | 17 | 18 |
|---|---|---|
| Composition (% by weight) | | |
| $SiO_2$ | 36 | 36 |
| $Al_2O_3$ | 33 | 33 |
| $B_2O_3$ | 15 | 15 |
| MgO | 5.5 | 5.5 |
| CaO | 1 | 1 |
| SrO | — | — |
| BaO | — | — |
| ZnO | 1 | 1 |
| $TiO_2$ | 4.5 | 4.5 |
| $ZrO_2$ | — | 1.2 |
| $P_2O_5$ | 1.5 | 1.5 |
| $SnO_2$ | 1.45 | — |
| $Cu_2O$ | 0.05 | — |
| $MnO_2$ | — | 0.3 |
| $Li_2O$ | 0.5 | 0.5 |
| $Na_2O$ | — | — |
| $K_2O$ | — | — |
| $Sb_2O_3$ | 0.5 | 0.5 |
| heat treatment 1 temperature (°C.) | 680 | 680 |
| time (hr) | 2 | 2 |
| heat treatment 2 temperature (°C.) | 850 | 850 |
| time (hr) | 2 | 2 |
| kind of the predominant crystalline phase* | mullite Al-B | mullite Al-B |
| kind of the subordinate crystalline phase | rutile | rutile |
| kind of laser | SHG of YAG | SHG of Ti-sapphire |
| wavelength (nm) | 532 | 430 |

TABLE 1-4-continued

| Example | 17 | 18 |
|---|---|---|
| energy density (J/cm²) | 3 | 1 |
| pulse width (ns) | 50 | 50 |
| number of pulse | 1 | 1 |
| bump height (Å) | 180 | 220 |
| result of texturing | ○ | ○ |

*Al-B: aluminum borate crystals

All the polished glass-ceramic products of the present invention prepared by forming, the following heat treating, and the following polishing the crystallizable glass compositions in Examples 1 to 16 contained mullite, or both mullite and aluminum borate crystals, as the main crystalline phase. The crystal grain size of the precipitated crystals was in the range of 0.5 to 1.8 μm, the bending strength was in the range of 190 to 230 MPa, and Ra was in the range of 5 to 20 Å. The glass-ceramic products had the desirable characteristics as magnetic disk substrates.

COMPARATIVE EXAMPLE 1

Raw materials for the components are weighed and mixed in such amounts that the glass composition would have the following composition: $SiO_2$: 18% by weight, $Al_2O_3$: 39% by weight, $B_2O_3$: 20% by weight, MgO: 15% by weight, ZnO: 3% by weight, $TiO_2$: 2% by weight, $ZrO_2$: 1% by weight, $P_2O_5$: 1% by weight, and $Li_2O$: 1% by weight. The obtained mixture was placed in a platinum crucible in an electric furnace, melted, and stirred to obtain a homogeneous glass. Then, the obtained homogeneous glass was formed into a plate of 50×50×5 mm. The obtained plate was annealed and cooled to obtain a formed product.

The obtained formed product was heat treated at 680° C. for 2 hours, and then at 870° C. for 2 hours to precipitate crystalline phase in the glass. The surface of the heat treated product was treated with lapping for 30 minutes by using silicon carbide abrasive grains having the average grain diameter of 10 μm, and then polished for 15 minutes with cerium oxide abrasive grains having the average grain diameter of 1 μm to obtain a polished product.

The polished product contained the main crystalline phase consisting of aluminum borate crystals. The content of other crystals in the product was very small. The crystal grain size was 1.0 μm, the bending strength was 220 MPa, and Ra was 16 Å.

As for the kind of the crystalline phase, the crystal grain size, the bending strength and $R_a$, the obtained glass-ceramic product had the characteristics required for the magnetic disk substrate of the present invention. However, the chemical durability of this product was inferior because the content of $SiO_2$ in the glass composition was insufficient.

COMPARATIVE EXAMPLE 2

Raw materials for the components are weighed and mixed in such amounts that the glass composition would have the following composition: $SiO_2$: 25% by weight, $Al_2O_3$: 48% by weight, $B_2O_3$: 15% by weight, MgO: 8% by weight, ZnO: 1% by weight, $Li_2O$: 1% by weight, $Na_2O$: 1% by weight, and $K_2O$: 1% by weight. The obtained mixture was placed in a platinum crucible in an electric furnace, melted, and stirred to obtain a homogeneous glass. This glass composition was devitrified and could not be formed because the content of $Al_2O_3$ in the glass composition was excessively large, and neither $TiO_2$ nor $P_2O_5$ was contained in the composition.

COMPARATIVE EXAMPLE 3

Raw materials for the components are weighed and mixed in such amounts that the glass composition would have the following composition: $SiO_2$: 25% by weight, $Al_2O_3$: 28% by weight, $B_2O_3$: 28% by weight, MgO: 12% by weight, CaO: 2% by weight, BaO: 2% by weight, ZnO: 1% by weight, and $TiO_2$: 2% by weight. The obtained mixture was placed in a platinum crucible in an electric furnace, melted, and stirred to obtain a homogeneous glass. This glass composition was devitrified and could not be formed because the content of $B_2O_3$ in the glass composition was excessively large, and $P_2O_5$ was not contained in the glass composition.

COMPARATIVE EXAMPLE 4

Raw materials for the components are weighed and mixed in such amounts that the glass composition would have the following composition: $SiO_2$: 30% by weight, $Al_2O_3$: 29% by weight, $B_2O_3$: 12% by weight, MgO: 21% by weight, CaO: 2% by weight, ZnO: 2% by weight, $TiO_2$: 2.5% by weight, $P_2O_5$: 0.5% by weight, and $Li_2O$: 1% by weight. The obtained mixture was placed in a platinum crucible in an electric furnace, melted, and stirred to obtain a homogeneous glass. Then, the obtained homogeneous glass was formed into a plate of 50×50×5 mm. The obtained plate was annealed and cooled to obtain a formed product.

The obtained formed product was heat treated at 700° C. for 2 hours, and then at 950° C. for 2 hours to precipitate crystalline phase in the glass. The surface of the heat treated product was treated with lapping for 30 minutes by using silicon carbide abrasive grains having the average grain diameter of 10 μm, and then polished for 15 minutes with cerium oxide abrasive grains having the average grain diameter of 1 μm to obtain a polished product.

The polished product contained the main crystalline phase consisting of cordierite. The content of other crystals in the product was very small. The crystal grain size was 1.2 μm, the bending strength was 145 MPa, and Ra was 15 Å.

This glass-ceramic product contained cordierite as the main crystalline phase because the amount of MgO was excessively large, and therefore had a low strength.

COMPARATIVE EXAMPLE 5

Raw materials for the components are weighed and mixed in such amounts that the glass composition would have the following composition: $SiO_2$: 36% by weight, $Al_2O_3$: 34% by weight, $B_2O_3$: 16% by weight, MgO: 8% by weight, $TiO_2$: 4% by weight, $Li_2O$: 1% by weight, and $K_2O$: 1% by weight. The obtained mixture was placed in a platinum crucible in an electric furnace, melted, and stirred to obtain a homogeneous glass. The glass composition showed a melting temperature as high as 1570° C. because $P_2O_5$ was not contained, and therefore the forming was extremely difficult.

COMPARATIVE EXAMPLE 6

Raw materials for the components are weighed and mixed in such amounts that the glass composition would have the following composition: $SiO_2$: 32% by weight, $Al_2O_3$: 32% by weight, $B_2O_3$: 20% by weight, MgO: 5% by weight, CaO: 4% by weight, BaO: 5% by weight, $P_2O_5$: 1% by weight, $MoO_3$: 0.5% by weight, and $Sb_2O_3$: 0.5% by weight. The obtained mixture was placed in a platinum crucible in an electric furnace, melted, and stirred to obtain a homogeneous glass. Then, the obtained homogeneous glass was formed into a plate of 50×50×5 mm. The obtained plate was annealed and cooled to obtain a formed product.

The obtained formed product was heat treated at 650° C. for 2 hours, and then at 900° C. for 2 hours to precipitate crystalline phase in the glass. The obtained formed product was worked in accordance with the above process. The bending strength of the obtained product was measured and found to be 160 MPa. The crystal grain size was 1.8 μm, and Ra was 19 Å. A sufficient bending strength could not be obtained because $TiO_2$ was not contained.

The compositions of the glass compositions in Comparative Examples 1 to 6 and the results of the evaluation are shown in Table 2.

TABLE 2

| Comparative Example | 1 | 2 | 3 | 4 | 5 | 6 |
| --- | --- | --- | --- | --- | --- | --- |
| Composition (% by weight) | | | | | | |
| $SiO_2$ | 18 | 25 | 25 | 30 | 36 | 32 |
| $Al_2O_3$ | 39 | 48 | 28 | 29 | 34 | 32 |
| $B_2O_3$ | 20 | 15 | 28 | 12 | 16 | 20 |
| MgO | 15 | 8 | 12 | 21 | 8 | 5 |
| CaO | — | — | 2 | 2 | — | 4 |
| BaO | — | — | 2 | — | — | 5 |
| ZnO | 3 | 1 | 1 | 2 | — | — |
| $TiO_2$ | 2 | — | 2 | 2.5 | 4 | — |
| $ZrO_2$ | 1 | — | — | — | — | — |
| $P_2O_5$ | 1 | — | — | 0.5 | — | 1 |
| $SnO_2$ | — | — | — | — | — | — |
| $MoO_3$ | — | — | — | — | — | 0.5 |
| $WO_3$ | — | — | — | — | — | — |
| $Li_2O$ | 1 | 1 | — | 1 | 1 | — |
| $Na_2O$ | — | 1 | — | — | — | — |
| $K_2O$ | — | 1 | — | — | 1 | — |
| $Sb_2O_3$ | — | — | — | — | — | 0.5 |
| heat treatment 1 | | | | | | |
| temperature (°C.) | 680 | — | — | 700 | — | 650 |
| time (hr) | 2 | — | — | 2 | — | 2 |
| heat treatment 2 | | | | | | |
| temperature (°C.) | 870 | — | — | 950 | — | 900 |
| time (hr) | 2 | — | — | 2 | — | 2 |
| kind of the predominant crystalline phase* | Al-B | — | — | cordierite | — | mullite |
| kind of the subordinate crystalline phase | — | — | — | — | — | Al-B |
| crystal grain size (μm) | 1.0 | — | — | 1.2 | — | 1.8 |
| bending strength (MPa) | 220 | — | — | 145 | — | 160 |
| Ra (Å) | 16 | — | — | 15 | — | 19 |

*Al-B: aluminum borate crystals

What is claimed is:

1. A glass-ceramic magnetic disk substrate which is prepared by forming, then heat treating, and then polishing a crystallizable glass composition comprising, expressed in terms of weight percent on the oxide basis:

from 20 to 45% $SiO_2$; from 0.5 to 5% $P_2O_5$;
from 25 to 45% $Al_2O_3$; from 0 to 2% $Li_2O$;
from 10 to 25% $B_2O_3$; from 0 to 2% $Na_2O$;
from 2 to 12% MgO; from 0 to 3% $K_2O$;
from 0.5 to 8% $TiO_2$;

wherein the total of the contents of $Li_2O$, $Na_2O$ and $K_2O$ is from 0 to 5%; and wherein said magnetic disk substrate comprises a main crystalline phase consisting of at least one member selected from the group consisting of mullite and aluminum borate crystals.

2. The glass-ceramic magnetic disk substrate according to claim 1, wherein said glass composition comprises, expressed in terms of weight percent on the oxide basis:

from 25 to 43% $SiO_2$; from 0.5 to 5% $P_2O_5$;

from 25 to 40% $Al_2O_3$; from 0 to 2% $Li_2O$;
from 10 to 22% $B_2O_3$; from 0 to 2% $Na_2O$;
from 3 to 7.5% MgO; from 0 to 3% $K_2O$;
from 0.5 to 8% $TiO_2$;
wherein the total of the contents of $Li_2O$, $Na_2O$ and $K_2O$ is from 0 to 3%.

3. The glass-ceramic magnetic disk substrate according to claim 1, wherein said glass composition comprises, expressed in terms of weight percent on the oxide basis:
from 30 to 40% $SiO_2$; from 0 to 2% $Li_2O$;
from 27 to 38% $Al_2O_3$; from 0 to 2% $Na_2O$;
from 12 to 20% $B_2O_3$; from 0 to 3% $K_2O$;
from 3.5 to 7% MgO; from 0 to 10% CaO;
from 1.5 to 6% $TiO_2$; from 0 to 10% BaO;
from 1 to 3% $P_2O_5$; from 0 to 10% ZnO;
wherein the total of the contents of $Li_2O$, $Na_2O$ and $K_2O$ is from 0 to 3%.

4. The glass-ceramic magnetic disk substrate according to claim 1, wherein said glass composition further comprises from 0.01 to 0.5% by weight of at least one member selected from the group consisting of Nb, La, Sn, Co, Mn, V, Cr, Cu, Au, Ag, Pt, Mo, Ni, Fe, Te, Ce, Se, Nd, Pr, Sm, Er and S.

5. The glass-ceramic magnetic disk substrate according to claim 1, wherein said magnetic disk substrate includes crystals having an average crystal grain size of at most 3 μm, and has a surface roughness of Ra≦50 Å.

* * * * *